United States Patent
Wu et al.

(10) Patent No.: US 6,654,537 B2
(45) Date of Patent: Nov. 25, 2003

(54) OPTICAL FIBER HOLDER ASSEMBLY

(75) Inventors: Kun-Tsan Wu, Tu-Chen (TW); Ming Chiang Tsai, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/999,645

(22) Filed: Oct. 31, 2001

(65) Prior Publication Data

US 2003/0063890 A1 Apr. 3, 2003

(30) Foreign Application Priority Data

Oct. 3, 2001 (TW) ..................................... 90216794 U

(51) Int. Cl.[7] ................................................. G02B 6/00
(52) U.S. Cl. ....................................................... 385/137
(58) Field of Search ................................. 385/134, 136, 385/137; 104/200; 174/40 CC; 248/49, 65

(56) References Cited

U.S. PATENT DOCUMENTS 4,327,964 A * 5/1982 Haesly et al. .................. 385/78

2002/0088905 A1 * 7/2002 Hansen ......................... 248/65

* cited by examiner

Primary Examiner—John D. Lee
Assistant Examiner—Sarah U Song
(74) Attorney, Agent, or Firm—Wei Te Chung

(57) ABSTRACT

An optical fiber holder assembly (2) includes a fiber holder (3) and a base (4). The fiber holder is assembled onto the base. The fiber holder is obtained by pressing a unitary sheet metal. The fiber holder has a body (31). Two inclined walls (38) are separately positioned at opposite ends of the body and extending downwardly from the body. Two openings (35) are separately defined in each inclined wall and a passageway formed therebetween. A guide slot (36) is defined in a middle of the body and communicates with the two openings. The fiber holder further includes two flexible portions (32). Each flexible portion has a fixing foot (34) and two opposite supporting arms (33). A clearance (37) is formed between the fixing foot and each supporting arm. The base defines two rectangular openings (41) for receiving the fixing feet.

12 Claims, 4 Drawing Sheets

OPTICAL FIBER HOLDER ASSEMBLY

BACKGROUND OF THE INVENTION

1. Field of the Invention

The present invention relates to an optical fiber holder assembly, and particularly to an optical fiber holder assembly which defines a guide slot for leading fibers and a passageway for containing the fibers.

2. Description of Related Art

Optical fibers that are currently commercially available comprise a central glass core, a glass cladding that surrounds the core, and a coating of synthetic polymer material. The use of optical fibers is increasing for communication. However, since optical fibers are thin and fragile, securement of optical fibers in optical path is necessary.

Prior art holder for receiving and holding a plurality of loose fibers in optical path mostly uses traditional wire holder. The prior art holder is commonly made of polymer material, and is assembled onto a base utilizing glue, so that its rigidity and resistance to wear of the holder is poor.

For example, as shown in FIG. 4, Taiwanese Patent No. 311696 which discloses an optical fiber holder comprising a base 11, a sliding block 12, a sliding element 13 and a screw 14. The sliding element 13 defines two grooves 131, and a center hole for receiving the screw 14. Fibers are received in the groove 131 and mounted to the groove 131 by rotating the screw 14 to press the fibers. The fibers are thin and fragile, and easy to be damaged when the pressure from the screw 14 on the fibers is too large. On the contrary, the fibers are easy to fall off from the grooves 131 when the pressure on the fibers from the screw 14 is too small.

The present invention provides an optical fiber holder assembly which defines a guide slot for admitting entrance of a fiber and a passageway for containing the fibers and avoiding the fibers from falling off.

SUMMARY OF THE INVENTION

An object of the present invention is to an improved optical fiber holder assembly, and particularly to an optical fiber holder assembly with a guide slot for leading fibers and a passageway for containing the fibers and avoiding the fibers from falling off.

An optical fiber holder assembly comprises a fiber holder and a base.

The fiber holder is obtained by pressing a unitary sheet metal. The fiber holder has a body, two inclined walls separately positioned at opposite end of the body and extending downwardly and outwardly from the body, and two openings separately defined in each inclined wall and a passageway formed therebetween. The fiber holder further comprises two flexible portions. A guide slot is defined in middle of the body 31 between the two flexible portions and communicates with the two openings. Each flexible portion comprises a fixing foot and two opposite supporting arms.

The base defines two rectangular openings for receiving the fixing feet.

In assembly, the fixing feet pass through the corresponding rectangular openings by pressing the flexible portions. The clearance of the fiber holder engages with adjacent portion of the base, and the supporting arms abut on an upper surface of the base, and the fixing feet abut a the lower surface of the base. This help mount the fiber holder stably onto the base.

In use, a plurality of optical fibers are put in the passageway of the fiber holder one by one through the guide slot. The inclined walls extends downwardly and outwardly from the body of the fiber holder, then the fibers are received in the passageway. The width of the guide slot is approximately equal to a diameter of one of the fibers, which avoids the fibers from falling off the passageway.

Other objects, advantages, and novel features of the present invention will become more apparent from the following detailed description when taken in conjunction with the accompanying drawings.

DETAILED DESCRIPTION OF THE INVENTION

Figure 1:
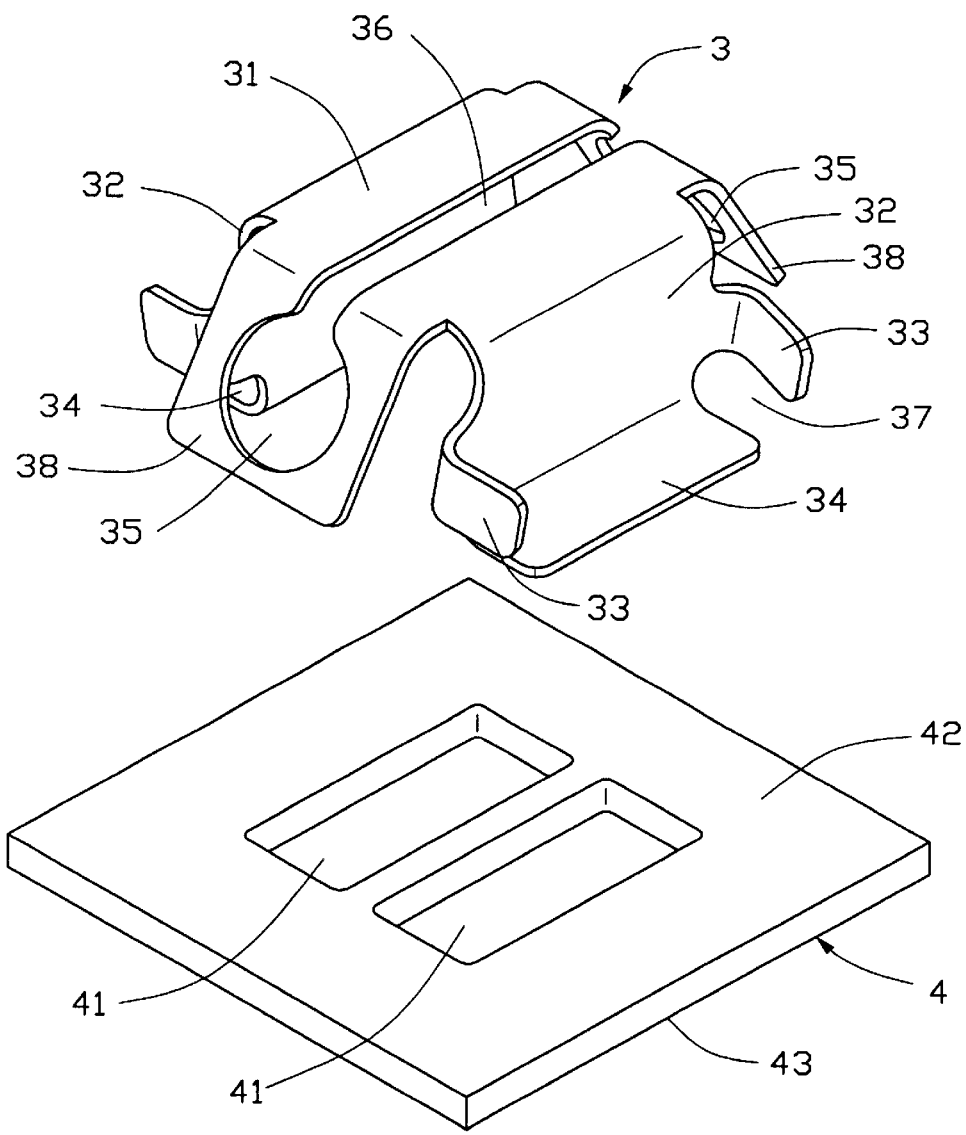
FIG. 1 is a perspective, exploded view of an optical fiber holder assembly of the present invention.
Figure 2:
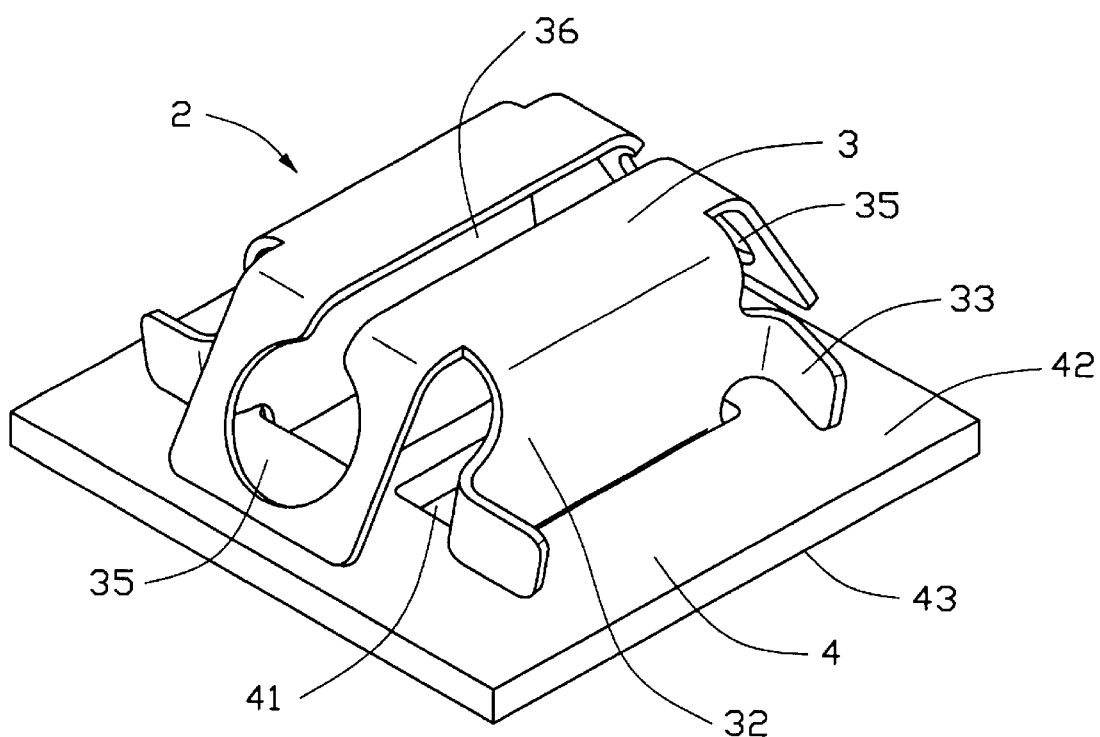
FIG. 2 is an assembled view of FIG. 1.

As shown in FIG. 1 and FIG. 2, an optical fiber holder assembly 2 comprises a fiber holder 3 and a base 4. The fiber holder 3 is assembled onto the base 4. The fiber holder 3 is a single piece and obtained by pressing a sheet metal.

The fiber holder 3 has a body 31, two opposite inclined walls 38 separately positioned at two opposite ends of the body 31 and extending downwardly and outwardly from the body 31, and two openings 35 separately defined in each inclined wall 38 and a passageway (not labeled) formed therebetween. The fiber holder 3 further comprises two flexible portions 32. Each flexible portion 32 is separately positioned at other two opposite ends of the body 31 and extends downwardly from the body 31. A guide slot 36 is defined in middle of the body 31 between the two flexible portions 32 and communicates with the two openings 35. Each flexible portion 32 comprises a fixing foot 34 and two opposite supporting arms 33. Two clearances 37 are formed between the fixing foot 34 and the supporting arms 33.

The base 4 defines two rectangular openings 41 for receiving the two fixing feet 34. The base 4 can be a stand-alone or a part of a housing used in optical communication.

In assembly, the fixing feet 34 pass through the corresponding rectangular openings 41 by pressing the flexible portions 32 toward each other. The pressing force acting on the flexible portions 32 is then released when the fixing feet have passed through the corresponding rectangular openings 41. Thereafter, the clearances 37 of the fiber holder 3 engage with the adjacent portion of the base 4, and the supporting arms 33 abut on an upper surface 42 of the base 4, and the fixing feet 34 abut on a lower surface 43 of the base 4. This makes the fiber holder 3 mount stably onto the base 4.

Figure 3:
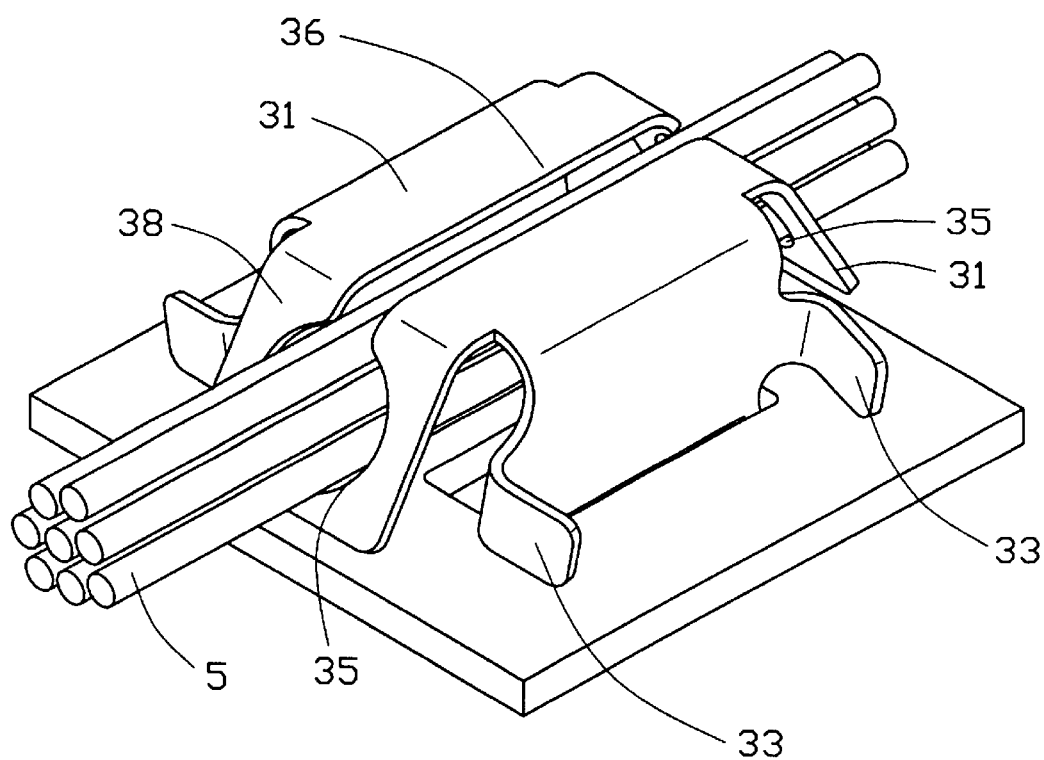
FIG. 3 is an assembled view of the optical fiber holder assembly with fibers received therein.
Figure 4:
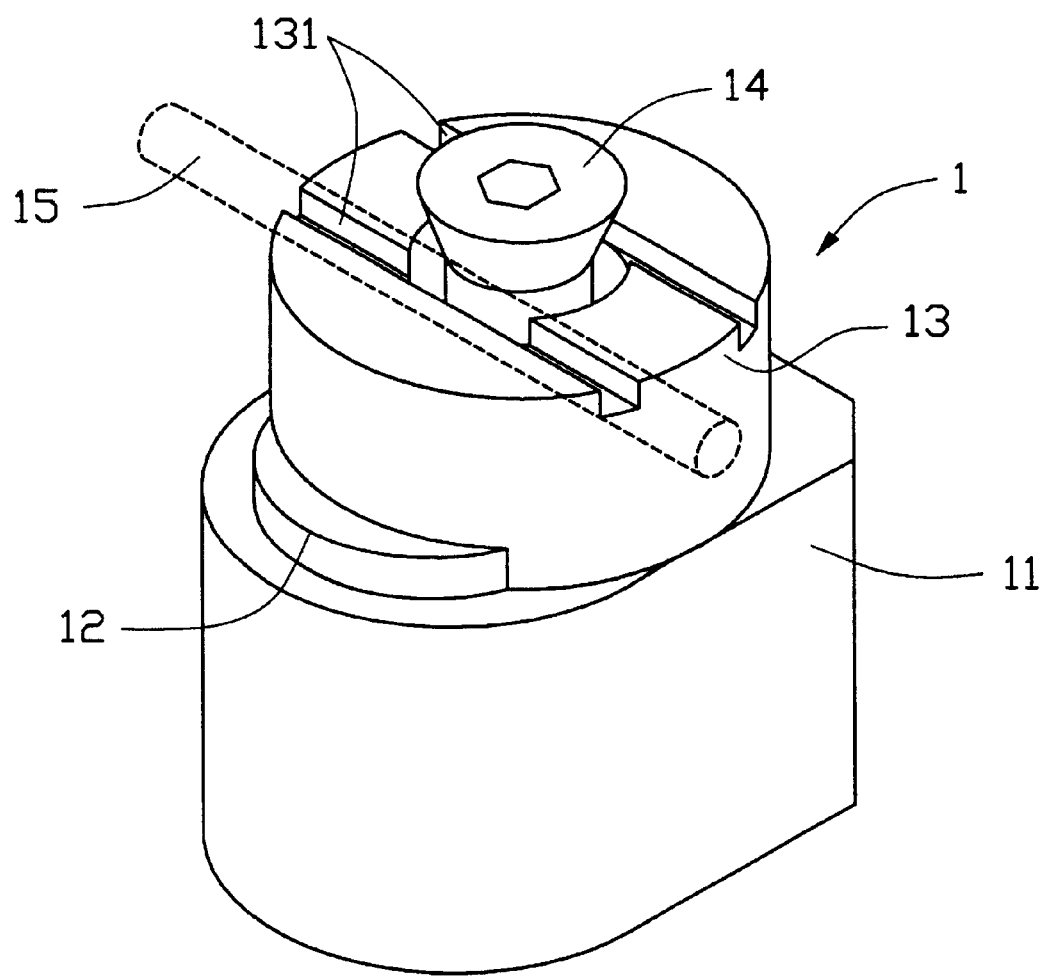
FIG. 4 is an assembled view of a fiber holder of prior art.

As shown in FIG. 3, with the fiber holder 3 assembled onto the base 4, a plurality of optical fibers 5 are put in the passageway of the fiber holder 3 one by one through the guide slot 36 of the fiber holder 3. The inclined walls 38 extend downwardly and outwardly from the body 31 of the fiber holder 3, then the fibers 5 are received in the passageway of the fiber holder 3. The width of the guide slot 35 is approximately equal to a diameter of one of the fibers 5, which avoids the fibers 5 from falling off the passageway of the fiber holder 3.

The optical fiber holder assembly 2 of the present invention is used to hold the fibers which are used in optical modules and communication systems. The fiber holder 3 and the base 4 are preferably made of metal. The fiber holder 3 is obtained by pressing a unitary sheet metal, and performance of the rigidity and wear is better than that made of polymer material.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber holder assembly for receiving and holding a plurality of fibers, comprising:

a base;

a fiber holder assembled on the base, the fiber holder comprising a body defining a guide slot for admitting entrance of a fiber, and two opposite inclined walls extending downwardly and bending outwardly at a certain angle from the body, each inclined wall defining an opening communicating with the guide slot, a passageway being formed between the two openings for receiving a bundle of fibers that enter trough the guide slot one by one.

2. The optical fiber holder assembly as claimed in claim 1, wherein the base defines two rectangular openings for mounting the fiber holder.

3. The optical fiber holder assembly as claimed in claim 2, wherein the fiber holder further comprises two flexible portions extending from two opposite ends of the body for mounting the fiber holder on the base.

4. The electrical connector as described in claim 3, wherein each flexible portion comprises a fixing foot for passing through the rectangular opening and abutting on a lower surface of the base, and at least one supporting arm abutting on an upper surface of the base.

5. The optical fiber holder assembly as claimed in claim 1, wherein a width of the guide slot is approximately equal to a diameter of the fiber.

6. The optical fiber holder assembly as claimed in claim 5, wherein the fiber holder is a unitary sheet of metal.

7. A fiber holder comprising:

a body defining a guide slot for admitting entrance of a fiber;

two opposite inclined walls separately extending downwardly and bending outwardly at a certain angle from the body, each inclined wall defining an opening communicating with the guide slot, a passageway being formed between the two openings for receiving a bundle of fibers that enter through the guide slot one by one; and at least one flexible portion extending from the body for stably mounting the fiber holder to a complementary mating device.

8. The fiber holder as claimed in claim 7, wherein the fiber holder comprises two flexible portions.

9. The fiber holder as claimed in claim 8, wherein each flexible portion comprises a fixing foot and two supporting arms.

10. The fiber holder as claimed in claim 7, wherein a width of the guide slot is approximately equal to a diameter of the fiber.

11. The fiber holder as claimed in claim 7, wherein the body, the walls and the at least one flexible portion are integral and are formed from a single sheet of metal.

12. A fiber holder assembly comprising:

a holder adapted to be mounted unto a plate base, said holder made from a metal sheet and defining a plate-like body extending in a lengthwise direction and defining a slot along said lengthwise direction;

two spaced opposite plate-like walls positioned by and integrally downwardly extending from two sides of said body, said walls defining a pair of openings aligned with each other along said lengthwise direction, two opposite ends of said slot further extending downwardly into said walls and communicating with the corresponding openings, respectively;

a plurality of optic fibers extending through both said openings along said lengthwise direction as a bundle; wherein a width of said slot is essential equal to a diameter of each optic fiber, and the opening is dimensioned to comply with a total cross-section of said bundle, and a joint portion of said slot and the corresponding opening in each wall receives more than one mutually urged fibers for preventing anyone of said fibers from being inadvertently dropped from the holder via said slot.

* * * * *